Sept. 13, 1949.                    L. D. STATHAM                    2,481,792
                           ELECTRIC ANGULAR ACCELEROMETER
Filed July 14, 1947                                          2 Sheets-Sheet 1

INVENTOR.
Louis D. Statham
By Philip Subkow
ATTORNEY.

Sept. 13, 1949.  L. D. STATHAM  2,481,792
ELECTRIC ANGULAR ACCELEROMETER
Filed July 14, 1947  2 Sheets-Sheet 2

Louis D. Statham INVENTOR.
BY Philip Subkow
ATTORNEY.

Patented Sept. 13, 1949

2,481,792

UNITED STATES PATENT OFFICE 2,481,792

ELECTRIC ANGULAR ACCELEROMETER

Louis D. Statham, Beverly Hills, Calif., assignor to Statham Laboratories, Inc., Los Angeles, Calif., a corporation of California Application July 14, 1947, Serial No. 760,773

14 Claims. (Cl. 201—63)

This invention relates to an angular accelerometer employing unbonded resistance strain wires for the measurement of the acceleration of a rotating mass.

Unbonded type resistance gauges have been successfully employed for the measurement of pressure and other forces which are transmissible to the gauge to cause a strain in the wire and a consequent change in resistance. They have also been successfully applied to the measurement of linear acceleration. Such gauges and accelerometers are described in an article entitled "Applications of Unbonded Type Resistance Gauges," by Richard D. Meyer, published in "Instruments," vol. 19, No. 3, March, 1946.

In the linear accelerometers of the prior art involving the use of strain wire elements, an inertial mass is directly connected and supported on strain sensitive wires which are connected to the inertial mass and to a support with respect to which the inertial mass moves upon the application of an accelerating force. As the inertial mass moves, a force is exerted upon the strain wires to cause an alteration in their dimensions and therefore a variation in their resistance. This variation in resistance is translatable into a measure of the acceleration. Such accelerometers are not adapted to measurement of angular acceleration.

I have devised an angular accelerometer employing the principle of the unbonded strain wire which is suitable for the measurement of acceleration of rotating masses. Essentially my new accelerometer is composed of a frame which may be mounted for rotation upon the rotatable member whose angular acceleration is to be measured and an inertial mass pivotally suspended in said frame, one end of said inertial mass being free to move about said hinge and said pivot being disposed coaxially with the axis of rotation of the mass whose acceleration is to be measured. A strain wire is strung between said frame and said inertial mass so that upon rotation of said frame the inertial mass moves upon said pivotal axis and causes an alteration in the length of the wire. The wire is connected to terminals which are held stationary with respect to the rotating frame. Suitable means for measuring the variation of resistance of said strain wire may be connected to such terminals.

I have found it desirable in such angular accelerometers to reduce the mass of accelerometer to as small dimension as possible in order that it may have but a negligible effect upon the rotating member whose acceleration is to be measured. This is desirable since the measurement of accelerating forces, particularly when they are small, is materially affected by any change in the mass of the member whose acceleration is to be measured, and especially so where said mass is altered in any appreciable degree by the addition of the weight of the instrument to said mass. The inertial mass adds a material fraction of the total weight of the instrument. In a strain wire accelerometer the sensitivity of the instrument depends upon obtaining a maximum output, that is, the change in resistance of the strain wire upon imposition of a given acceleration to the instrument. Since the acceleration in such instruments is measured as the force necessary to accelerate the inertial mass, and since this force is measured as the variation of the strain and therefore resistance in the wire, the desire to reduce the mass of the inertial member while maintaining the total change of resistance as high as possible imposes contradictory desiderata.

I have in my design solved this dilemma by building a mechanical advantage into my angular accelerometer. I have accomplished this end by so mounting the inertial mass with respect to the strain wire that the wires are affected by the movement of the mass through a leverage system. By employing the mechanical advantage of this leverage system, I have been able to multiply the total force exerted on the strain wire upon the acceleration of the inertial mass and thus have been able to multiply the effect and obtain a desired resistance change with a minimized mass. I accomplish this result in a simple manner by mounting the strain wires on pins on the frame and on the inertial mass so that the strain wires extend in a direction perpendicular to the axis of rotation of the frame and therefore the pivotal axis of the pivotally mounted inertial mass.

These and other objects of my invention will appear from the description of the preferred embodiment thereof taken together with the drawing, in which Fig. 1 is a vertical section through my angular accelerometer;

Figure 2:
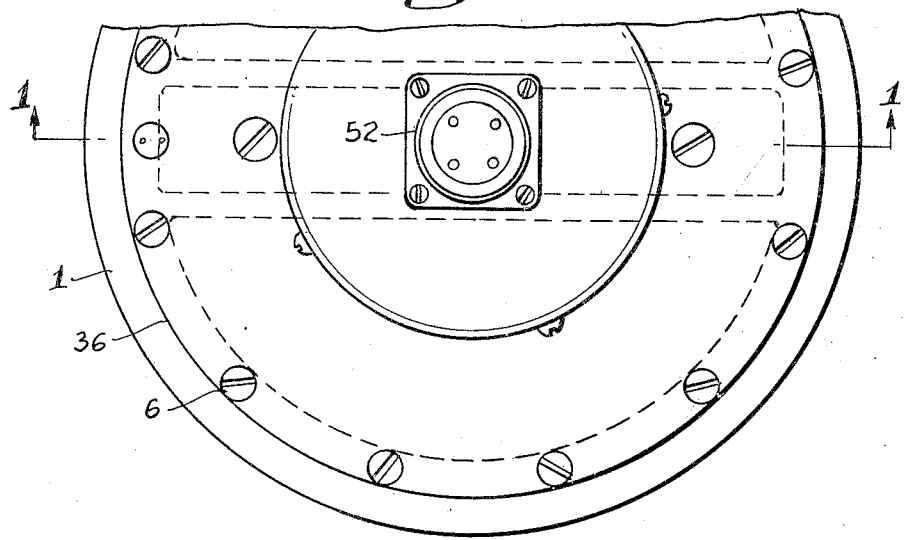
Fig. 2 is a plan view of Fig. 1 with parts broken away.

The angular accelerometer is composed of a base 1 which may be mounted upon a rotating member whose angular acceleration is to be measured. Base 1 carries an annular rim 2 surrounding a bore 3. Mounted on the annular rim 2 is a flexible diaphragm 4 to provide a chamber 3. The disc 5 is mounted on the diaphragm 4 by means of screws 6. The disc 5 carries a box-like member 7. Positioned on the disc 5 and within the box member 7 is a frame 8. The frame is composed of two elongated beams 9 and 10 connected by a cross member 11 at a point adjacent but to one side of a central axis of the frame. The end of the beams 9 and 10 are connected by cross members 12 and 13. The frame fits in the box member 7 with some clearance between the ends of the beams 9 and 10 and the cross members 12 and 13 from the ends of the box member. The inertial mass 14 in the form of a bar of dimensions to fit within the frame is notched at 14' and 15 on both sides of the central transverse axis of the mass.

A flat spring 16 is clamped to the base of the slot 15 by means of the clamping plate 17 and screw 18. The spring is also clamped to the cross member 11 by means of the clamping plate 19 and the screw 20. A cover plate 21 is screwed to the base of the inertial mass 14 by means of plate 22.

It will be observed that there is clearance on all four sides of the chamber formed by the slot 14' and the cover plate 21. Clearance is provided between the base of the clamping plate 19 and the opposed face of the cover plate 21. A similar clearance is also provided between the face of the clamping plate 17 and the opposed face of the cover plate 21.

A stop pin 23 is mounted on the end of the inertial mass 14 and is positioned within the square opening 25 in the stop plate 24' which is held in position on the cross member 12 by means of screws 26 which pass through elongated slotted openings 27 in the member 12. Two anodized aluminum pins 28a and 28b are mounted on the cover plate 21. The axes of the pins 28a and 28b are coincident with the axis of bending of the plate 16 in the space between the opposing faces of the plates 19 and 17, and coincident with the axis of rotation of the plate 1. Two annular pins 29a and 29b are positioned on the back of the inertial member 14 and coaxially disposed with the pins 28a and 28b. Two similar pins 30a and 30b are mounted on the forward face of the member 13 aligned respectively with the pins 28a and 28b. Two similar pins 31a and 31b are likewise mounted on the opposite faces of the member 13 and aligned with the pins 29b and 29a respectively.

The pins 28a, 28b, 29a, 29b, 30a, 30b, 31a and 31b are anodized. Metallic pins 34a, 34b, 34c, and 34d are mounted in the forward face of the member 13 and insulated therefrom by insulating bushings, and four similar pins 35a, 35b, 35c, and 35d are mounted on the opposite face of the member 13 and insulated therefrom by insulating bushings. Wound on pins 28b and 30b is a loop of strain wire 32, the ends of which are connected respectively to the pins 34a and 34b. Wound upon pins 28a and 30a, respectively, is a loop of strain wire 32a, the ends of which are connected respectively to the terminals 34a and 34c. Mounted on pins 29b and 31b is a loop of strain wire 33b, the ends of which are connected respectively to the terminals 35c and 35d. Mounted on pins 29a and 31a is a loop of strain wire 33a, the ends of which are connected to the terminal pins 35a and 35b. The wires are insulated from the pins by anodized coating and the pins upon which they are mounted, but are electrically connected to the terminal pins 34a to 34d and 35a to 35d, respectively, as stated above. The wires extend in a direction substantially perpendicular to the axis of bending of the spring 16 and substantially parallel to the complementary faces of the frame and the inertial mass and spaced therefrom. These constitute, therefore, unbonded strain wire elements.

Figure 1:
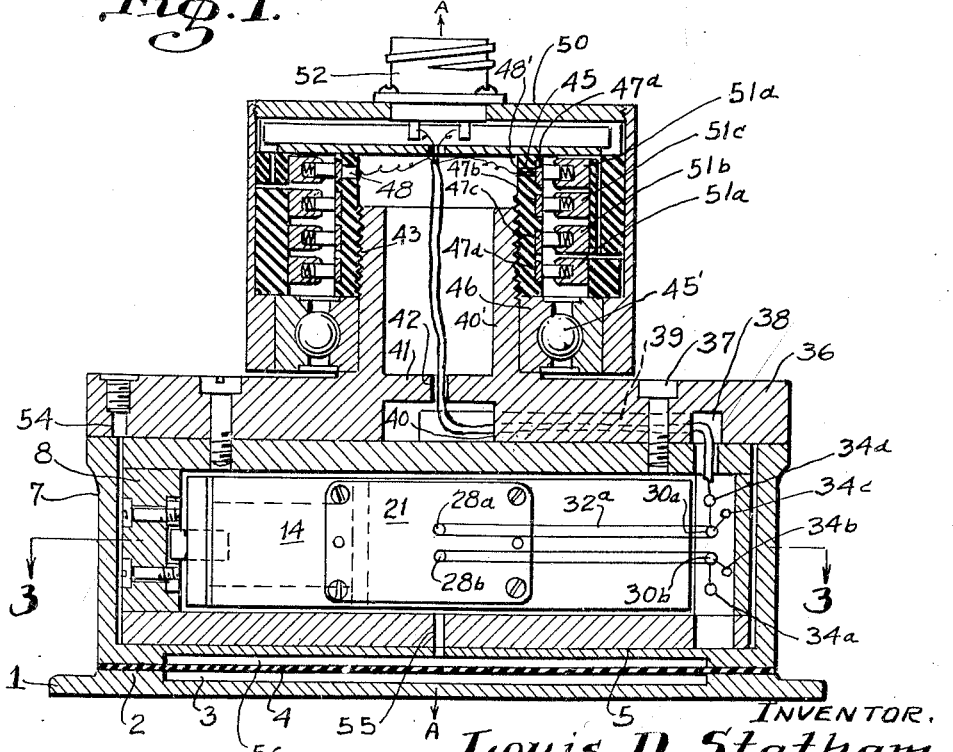
Figure 3:
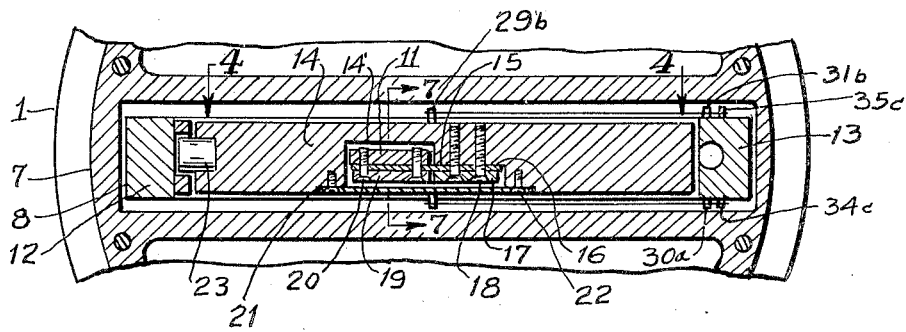
Fig. 3 is a section taken on line 3—3 of Fig. 1 with parts broken away.
Figure 4:
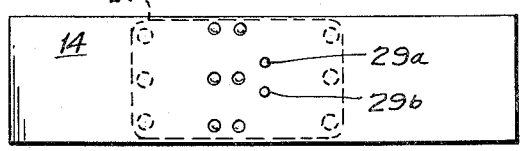
Fig. 4 is a fragmentary view of the inertial mass on the reverse side of that shown in Fig. 1.
Figures 5, 6:
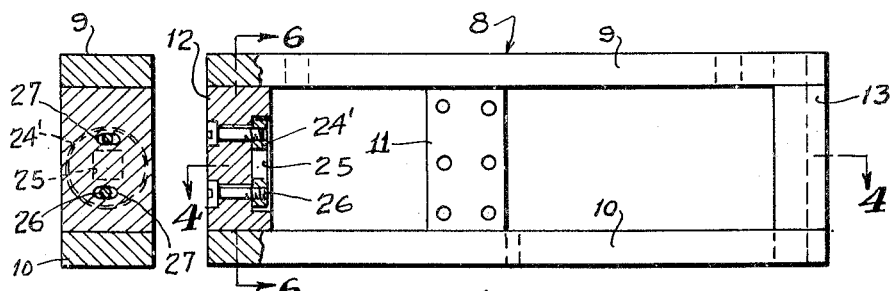
Fig. 5 is a plan view of the frame of my accelerometer with parts in section.
Fig. 6 is a view taken along the line 6—6 of Fig. 5.
Figure 7:
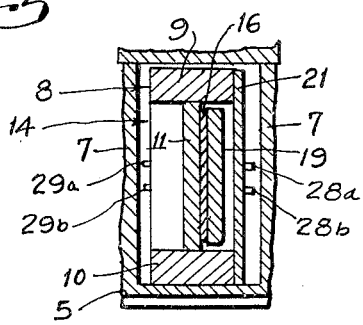
Fig. 7 is a section taken along the line 7—7 of Fig. 3.
Figure 8:
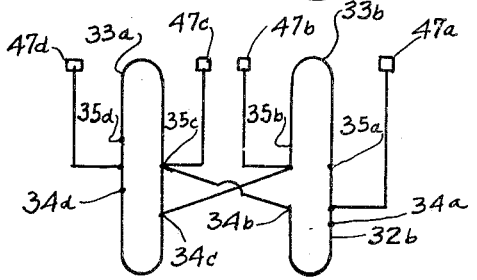
Fig. 8 is the wiring diagram of the strain wire assembly.

An oblong plate 36 fits over the box member 7 and is connected to the frame 19 by means of screws 37. The oblong cover 36 contains a bore 38 and a slot 39 which communicate with a central bore 40. Centrally mounted on the cover 36 is a tubular boss 40' which is separated from the bore 40 by means of diaphragm 41 through which is disposed a bore 42. The end of the external surface of the tubular boss 40 is threaded at 43. An insulating sleeve 45 is threaded upon the boss upon the threads 43. The stationary shell 46 is mounted on ball bearings 45'. Four slip rings 47a, 47b, 47c, and 47d are positioned on the insulating bushing 45. Mounted on the inside of the case 46 is an insulating sleeve 50 carrying brush contacts 51a, 51b, 51c, and 51d. Pins 34d and 35d are connected to slip ring 47d and the pins 34a and 35a are connected to the slip ring 47a. The terminals 35c and 34b are connected to the slip ring 47c and the terminals 35b and 34c are connected to the slip ring 47b by insulated wires, as shown schematically in Fig. 5. The wiring is omitted from Fig. 1 for clarity. Brushes 51a, 51b, 51c, and 51d are severally connected by insulated wires passing through the bores 48, 48', 49, and 49' to the four terminals of the terminal block 52 which is mounted in the top 50 of the case 46.

The interior of the member 36 is filled with insulating fluid of low viscosity temperature coefficient such as a high grade lubricating oil or organo-silicon polymer fluid which is introduced into the chamber through the bore 54 provided with a suitable plug. The fluid also passes through the bore 55' into the chamber 56 between the diaphragm 4 and plate 5. The chamber 3 between the diaphragm 4 and the bottom plate 1 is open and filled with air at atmospheric pressure.

It will be observed that when this instrument is mounted upon a rotating member such as a plate or shaft with the axis of A—A passing through the axis of rotation, the hinge point or the axis of bending of the plate 16 is coincident with the axis of rotation A—A. When the instrument is in uniform rotary motion, no displacement of the inertial mass 14 upon the flexible spring member is obtained. However, when the rotating mass is accelerated an accelerating force is imposed on the inertial mass 14 which takes a position with its longitudinal axis at an angle to its rest position, the angle depending upon the force exerted, to wit, depending upon the mass of the member 14 and the restraining force of the strain wires and the spring. It will be observed that the restraining force imposed by the flat spring is but a small fraction of the total restraining force, about 5 or 10%, and therefore may be neglected. Upon such angular movement of the inertial mass 14 with respect to its position of rest, the wires 32a and 32b are increased in strain and the wires 33a and 33b decreased in strain or vice versa, depending upon the direction of acceleration.

It will also be observed that the moment of forces about the axis of bending (i. e., the pivotal axis) acts through a bell crank lever arm including the pins 28a, 28b, 29c, and 29b upon the strain wire which imparts a mechanical advantage, i. e., a multiplication of the force. I am therefore able, for a given desired alteration in resistance of the strain wire, to employ a smaller mass than would be necessary if the force were applied directly (i. e., in line with) to the strain wire. I am thus able to reduce the weight of the inertial mass and of the whole instrument without sacrificing the sensitivity of the instrument for its power output, that is, the total resistance change upon application of a given accelerating force. This is of importance since, especially for light rotating masses, it is essential that the added mass of the instrument be small so as to impart but a negligible addition to the mass of the rotating member whose acceleration is to be measured.

Since these wires are connected to a Wheatstone bridge in the manner conventional for unbonded strain gauges as described in the above mentioned article, the total change in resistance is the measure of the angular acceleration. Due to the fact that the total deflection of the inertial mass from its position of rest is under about 1°, the total force imposed upon the strain wires is substantially directly proportional to the accelerating force and the instrument is therefore linear within the accuracy of the resistance measuring instrument.

It will also be observed that the force causing the alteration in the length of the wires is equal to the force exerted by the inertial moment of the inertial mass acting as a lever system including the pins 28a, 28b, 29a, and 29b.

The mass 14 is balanced about the axis of bending and the whole instrument is balanced about the central axis A—A; that is to say, the center of mass of the inertial mass is substantially coincident with the axis of bending of the spring 16 and the center of mass of the instrument is substantially coincident with the central axis of rotation A—A, so that no unbalanced forces are exerted on rotation of the instrument and the true acceleration may be determined.

While I have described a particular embodiment of my invention for the purpose of illustration, it should be understood that various modifications and adaptations thereof may be made within the spirit of the invention as set forth in the appended claims.

I claim:

1. An angular strain wire accelerometer, comprising a case adapted to be rotatably mounted about an axis of rotation, a frame mounted in said case to rotate with said case about said axis of rotation, an inertial mass pivotally mounted on said frame, the axis of said pivot being substantially coincidental with the said axis of rotation of said frame, a strain wire connected to said frame and to said mass, and electrical terminal contacts mounted on said case and adapted to be connected to said strain wire, said terminals being relatively stationary with respect to the rotation of said frame.

2. An angular strain wire accelerometer, comprising a case adapted to be rotatably mounted about an axis of rotation, a frame mounted in said case to rotate with said case about said axis of rotation, an inertial mass pivotally mounted on said frame, the axis of said pivot being substantially coincidental with the said axis of rotation of said frame, the center of said inertial mass rotation, a strain wire connected to said frame and to said mass, and electrical terminal contacts connected to said strain wire, said terminals being relatively stationary with respect to the rotation of said frame.

3. An angular strain wire accelerometer, comprising a case adapted to be rotatably mounted about an axis of rotation, a frame mounted in said case to rotate with said case about said axis of rotation, an inertial mass pivotally mounted on said frame, the axis of said pivot being substantially coincidental with the said axis of rotation of said frame, a strain wire connected to said frame and to said mass, said strain wire extending in a direction perpendicular to said pivotal axis, and electrical terminal contacts connected to said strain wire, said terminals being relatively stationary with respect to the rotation of said frame.

4. An angular strain wire accelerometer, comprising a case adapted to be rotatably mounted about an axis of rotation, a frame mounted in said case to rotate with said case about said axis of rotation, an inertial mass pivotally mounted on said frame, the axis of said pivot being substantially coincidental with the said axis of rotation of said frame, the center of said inertial mass being substantially coincidental with said axis of rotation, a strain wire connected to said frame and to said mass, said strain wire extending in a direction perpendicular to said pivotal axis, and electrical terminal contacts connected to said strain wire, said terminals being relatively stationary with respect to the rotation of said frame.

5. An angular accelerometer, comprising a frame having opposite faces rotatably mounted about an axis of rotation, an inertial mass having opposite faces hingedly mounted on said frame at a point intermediate the ends of said inertial mass, a strain wire support mounted on one of the faces of said mass and on one of the faces of said frame, and a strain wire mounted on said supports.

6. An angular accelerometer, comprising a frame having opposite faces rotatably mounted about an axis of rotation, an inertial mass having opposite faces hingedly mounted on said frame at a point intermediate the ends of said inertial mass and substantially coincident with the center of said inertial mass, a strain wire support mounted on each of the opposite faces of said mass and on each of the opposite faces of said frame, and strain wires mounted on said supports.

7. An angular accelerometer, comprising a frame having opposite faces rotatably mounted about an axis of rotation, an inertial mass having opposite faces hingedly mounted on said frame at a point intermediate the ends of said inertial mass and substantially coincident with the center of said inertial mass and said axis of rotation, a strain wire support mounted on each of the opposite faces of said mass and on each of the opposite faces of said frame, and strain wires on said supports.

8. An angular accelerometer, comprising a frame having opposite faces rotatably mounted about an axis of rotation, an inertial mass having opposite faces hingedly mounted on said frame at a point intermediate the ends of said inertial mass, a strain wire support mounted on one of the faces of said mass and on one of the faces of said frame, and a strain wire mounted on said supports, said strain wires extending substantially perpendicular to said pivotal axis.

9. An angular accelerometer, comprising a frame having opposite faces rotatably mounted about an axis of rotation, an inertial mass having opposite faces hingedly mounted on said frame at a point intermediate the ends of said inertial mass and substantially coincident with the center of said inertial mass, a strain wire support mounted on each of the opposite faces of said mass and on each of the opposite faces of said frame, and strain wires mounted on said supports, said strain wires extending substantially perpendicular to the said pivotal axis.

10. An angular accelerometer, comprising a frame having opposite faces rotatably mounted about an axis of rotation, an inertial mass having opposite faces hingedly mounted on said frame at a point intermediate the ends of said inertial mass and substantially coincident with the center of said inertial mass and said axis of rotation, a strain wire support mounted on each of the opposite faces of said mass and on each of the opposite faces of said frame, and strain wires on said supports, said strain wires extending substantially perpendicular to the said pivotal axis.

11. An angular strain wire accelerometer, comprising a frame adapted to be rotatably mounted on an axis of rotation, an inertial mass pivotally mounted on said frame, a strain wire mechanically connected to said inertial mass and adapted to be subjected to a change in the strain imposed on said wire by the displacement of said mass on its hinge on angular acceleration of said mass, and electrical connections to said strain wire for measurement of the resistance of said strain wire.

12. An angular strain wire accelerometer, comprising a frame adapted to be rotatably mounted about an axis of rotation, an inertial mass pivotally mounted on said frame, a strain wire connected to said frame and said mass, and means for electrically connecting a resistance meter to said strain wire.

13. An angular strain wire accelerometer, comprising a frame adapted to be rotatably mounted on an axis of rotation, an inertial mass pivotally mounted on said frame, a strain wire mechanically connected to said mass at a point on said mass remote from said axis, the other end of said wire being mechanically connected to said frame, and means for connecting an electrical resistance meter to the ends of said strain wire.

14. An angular strain wire accelerometer, comprising a frame adapted to be rotatably mounted on an axis of rotation, an inertial mass pivotally mounted on said frame, a strain wire mechanically connected to said mass at a point on said mass remote from said axis, the other end of said wire being mechanically connected to said frame, and means for connecting an electrical resistance meter to the ends of said strain wire, said wire extending in a direction perpendicular to the pivot.

LOUIS D. STATHAM.

REFERENCES CITED

The following references are of record in the file of this patent:

UNITED STATES PATENTS

| Number | Name | Date |
|---|---|---|
| 2,274,926 | Kimmick | Mar. 3, 1942 |
| 2,391,966 | Harrison | Jan. 1, 1946 |
| 2,435,231 | McPherson | Feb. 3, 1948 |

Certificate of Correction

Patent No. 2,481,792September 13, 1949

LOUIS D. STATHAM

It is hereby certified that error appears in the printed specification of the above numbered patent requiring correction as follows:

Column 6, line 3, after the word "mass" insert *being substantially coincident with said axis of*;

and that the said Letters Patent should be read with this correction therein that the same may conform to the record of the case in the Patent Office.

Signed and sealed this 17th day of January, A. D. 1950.

[SEAL]

THOMAS F. MURPHY,
*Assistant Commissioner of Patents.*